（12）United States Patent
Bolz et al.

(10) Patent No.: US 9,448,935 B2
(45) Date of Patent: Sep. 20, 2016

(54) SURFACE RESOURCE VIEW HASH FOR COHERENT CACHE OPERATIONS IN TEXTURE PROCESSING HARDWARE

(71) Applicant: NVIDIA CORPORATION, Santa Clara, CA (US)

(72) Inventors: Jeff Bolz, Austin, TX (US); Patrick R. Brown, Wake Forest, NC (US); Steven J. Heinrich, Madison, AL (US); Dale L. Kirkland, Madison, AL (US); Joel McCormack, Boulder, CO (US)

(73) Assignee: NVIDIA Corporation, Santa Clara, CA (US)

( * ) Notice: Subject to any disclaimer, the term of this patent is extended or adjusted under 35 U.S.C. 154(b) by 100 days.

(21) Appl. No.: 14/037,212

(22) Filed: Sep. 25, 2013

(65) Prior Publication Data

US 2015/0089151 A1    Mar. 26, 2015

(51) Int. Cl.
*G06F 12/00* (2006.01)
*G06F 12/08* (2016.01)
*G06F 12/10* (2016.01)
*G06F 12/12* (2016.01)

(52) U.S. Cl.
CPC ....... *G06F 12/0815* (2013.01); *G06F 12/1018* (2013.01); *G06F 12/128* (2013.01); *G06F 2212/455* (2013.01); *Y02B 60/1225* (2013.01)

(58) Field of Classification Search
CPC .................. G06F 12/128; G06F 12/1018
USPC .................. 711/141, 147, 154; 345/552, 582
See application file for complete search history.

(56) References Cited

U.S. PATENT DOCUMENTS

2012/0281925 A1*  11/2012  Nystad ................. H04N 19/90
                                              382/232
2015/0084975 A1*   3/2015  Heinrich et al. ............ 345/552

\* cited by examiner

*Primary Examiner* — Reba I Elmore
(74) *Attorney, Agent, or Firm* — Artegis Law Group, LLP

(57) ABSTRACT

Techniques are disclosed for performing memory access operations. A texture unit receives a memory access operation that includes a tuple associated with a first view in a plurality of views. The texture unit retrieves a first hash value associated with a first texture header in a plurality of texture headers, where the first texture header is related to the first view. The texture unit retrieves a second hash value associated with a second texture header in the plurality of texture headers, where the second texture header is related to a second view. The texture unit determines whether the first view is potentially aliased with the second view, based on the first and second hash values. If so, then the texture unit invalidates a cache entry in a cache memory associated with the second texture header. Otherwise, the texture unit maintains the cache entry.

21 Claims, 8 Drawing Sheets

| Texture ID 515 | View Type 520 | Data Size 525 | Width 530 | Height 530 | Depth/ Layer 535 | Hash Value 540 | Base Virtual Address 545 |
|---|---|---|---|---|---|---|---|
| 0 | 2D Array | 2 | 16 | 16 | 8 | 1 | 0xB800_0000 |
| 1 | 3D Texture | 4 | 32 | 32 | 16 | 0 | 0xB900_0000 |
| 2 | 2D Array | 4 | 32 | 32 | 8 | 0 | 0xB900_8000 |
| 3 | 2D Slice | 4 | 32 | 32 | n/a | 0 | 0xB900_9000 |
| 4 | 2D Array | 1 | 16 | 16 | 10 | 0 | 0xBA00_0000 |
| 5 | 2D Slice | 1 | 16 | 16 | n/a | 0 | 0xBA00_0500 |

Figure 5

SURFACE RESOURCE VIEW HASH FOR COHERENT CACHE OPERATIONS IN TEXTURE PROCESSING HARDWARE

BACKGROUND OF THE INVENTION

1. Field of the Invention

Embodiments of the present invention relate generally to memory access operations and, more specifically, to a surface resource view hash for coherent cache operations in texture processing hardware.

2. Description of the Related Art

A modern graphics processing unit (GPU) includes texture processing hardware configured to perform a variety of texture-related operations, including texture load operations and texture cache operations. The texture processing hardware accesses surface texture information from the texture cache while rendering object surfaces in a three-dimensional (3D) graphics scene for display on a display device. Surface texture information includes texture elements (texels) used to texture or shade object surfaces in a 3D graphics scene.

The texture processing hardware typically accesses surface texture information using "tuples" rather than via a linear virtual or physical memory address, where a tuple is an ordered list of elements. For example, the texture processing hardware could access a surface texture by specifying a tuple that includes x, y, and z coordinates, an index, and a texture identifier. Accordingly, each cache line resident in the texture cache includes the corresponding memory data, and the tuple representing the first texel location in the cache line.

The texture processing hardware may access surface texture information using multiple views. For example, one view of a 3D texture surface could provide access to the surface texture as a 3D surface where x, y, and z coordinates specify a particular texel in the 3D surface. A second view of the same 3D texture surface could access the surface texture as an array of 2D surfaces, where an index specifies a particular 2D surface, and x and y coordinates specify a particular texel in the 2D surface. A third view of the same 3D texture could access a 2D portion or "slice" of the 3D surface, where x and y coordinates specify a particular texel in the 2D slice.

One drawback with this approach is that such multiple views of a surface may cause cache coherency and consistency problems. If multiple views of a surface texture are simultaneously active, then the texture cache may include multiple texture cache entries that specify the same cache line. Each of the multiple cache entries may specify the tuple corresponding to a different view of the same surface in the texture cache. If the texture processing hardware writes to the cache line corresponding to a first view, then the data may be written to the cache line corresponding to that view. If the texture processing hardware subsequently accesses the surface via a second view, then the accessed data may be stale data from the cache line corresponding to the second view, rather than the updated data from the cache line corresponding to the first view. One possible solution is that the texture processing hardware may invalidate all cache lines when data is written to any cache lines. However, such an approach may substantially increase cache misses and accesses to system memory. As a result, cache performance may be reduced and power consumption may increase.

As the foregoing illustrates, what is needed in the art is an improved technique for implementing coherent cache operations in a texture cache memory.

SUMMARY OF THE INVENTION

One embodiment of the present invention sets forth a method for performing memory access operations. The method includes receiving a first memory access operation that includes a first tuple associated with a first view in a group of views. The method further includes retrieving a first hash value associated with a first texture header in a group of texture headers, where the first texture header is related to the first view. The method further includes retrieving a second hash value associated with a second texture header in the group of texture headers, where the second texture header is related to a second view in the group of views. The method further includes determining whether at least a portion of the first view is potentially aliased with at least a portion of the second view, based on the first hash value and the second hash value. The method further includes, if at least a portion of the first view is potentially aliased with at least a portion of the second view, then invalidating a cache entry in a cache memory associated with the second texture header, or, if no portion of the first view is potentially aliased with any portion of the second view, then maintaining the cache entry associated the second texture header.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

One advantage of the approaches disclosed herein is that cache coherency and consistency of a texture cache is maintained, even when multiple views of a surface texture map are simultaneously active. When an aliased cache line experiences an invalidating event, only those cache lines with a matching hash value are invalidated. Texture cache misses and, correspondingly, fetches from system memory are thereby reduced. As a result, cache performance is improved and power consumption is reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a texture header table as stored in the tag unit of FIG. 4, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
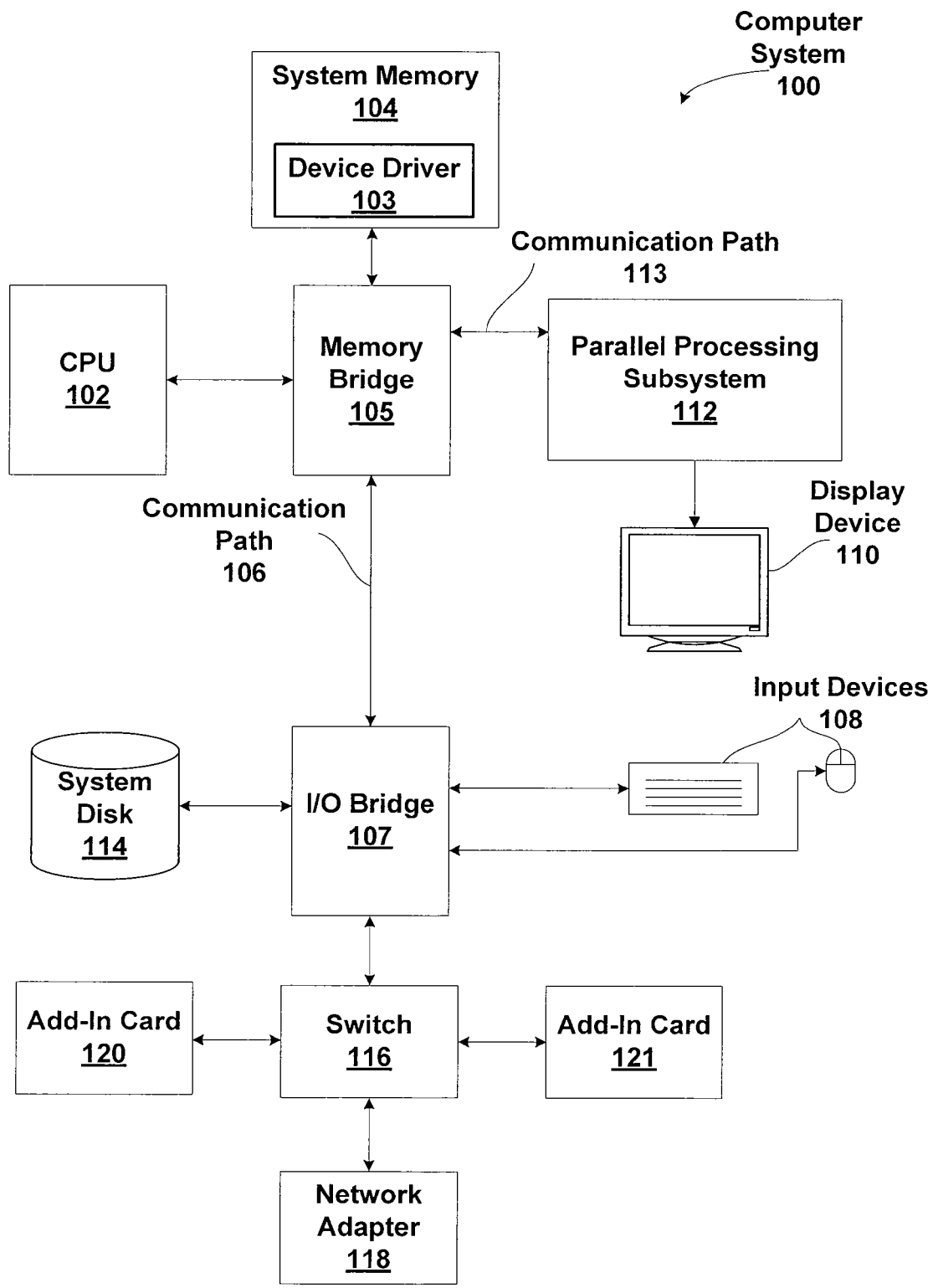
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
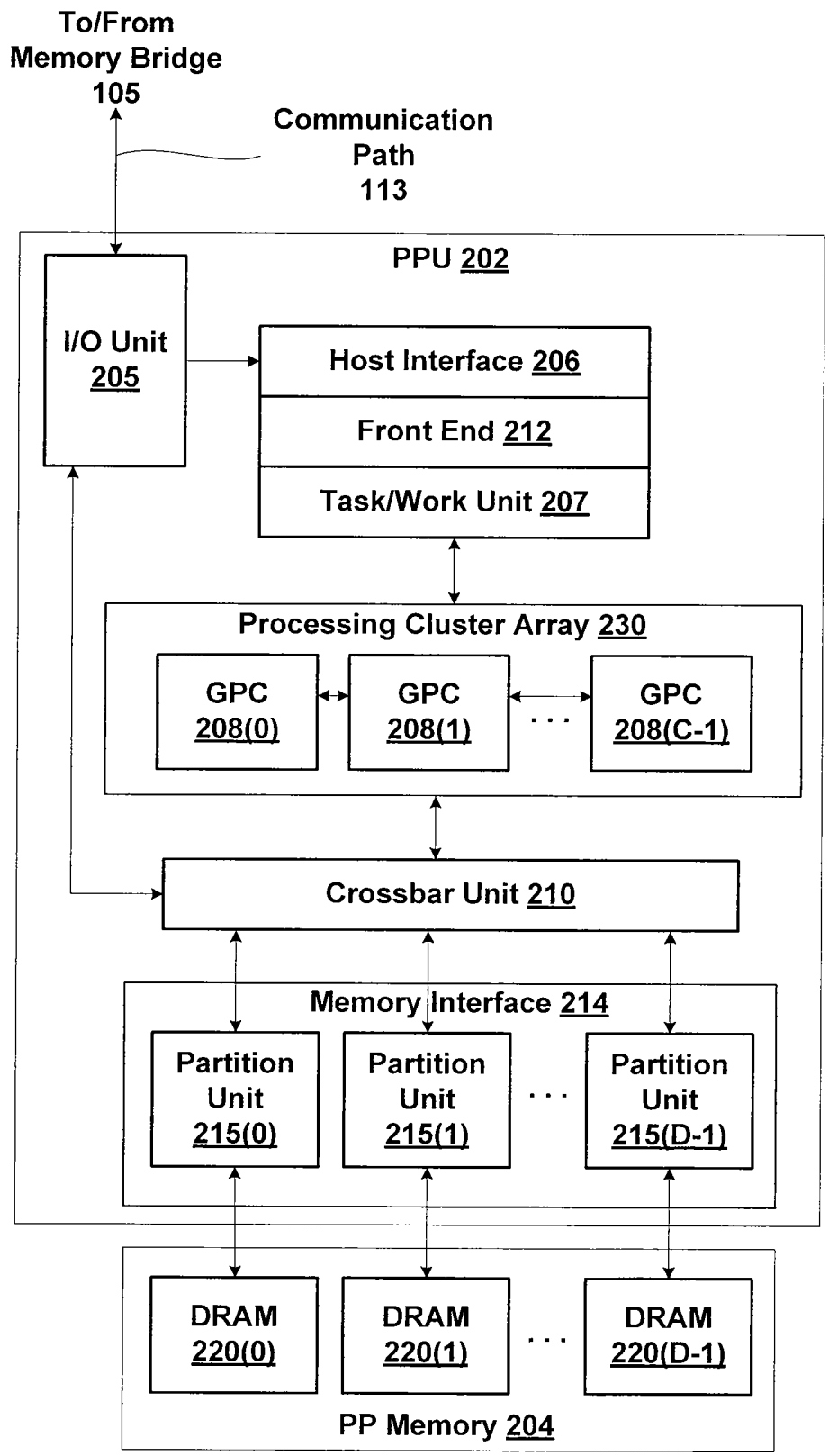
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
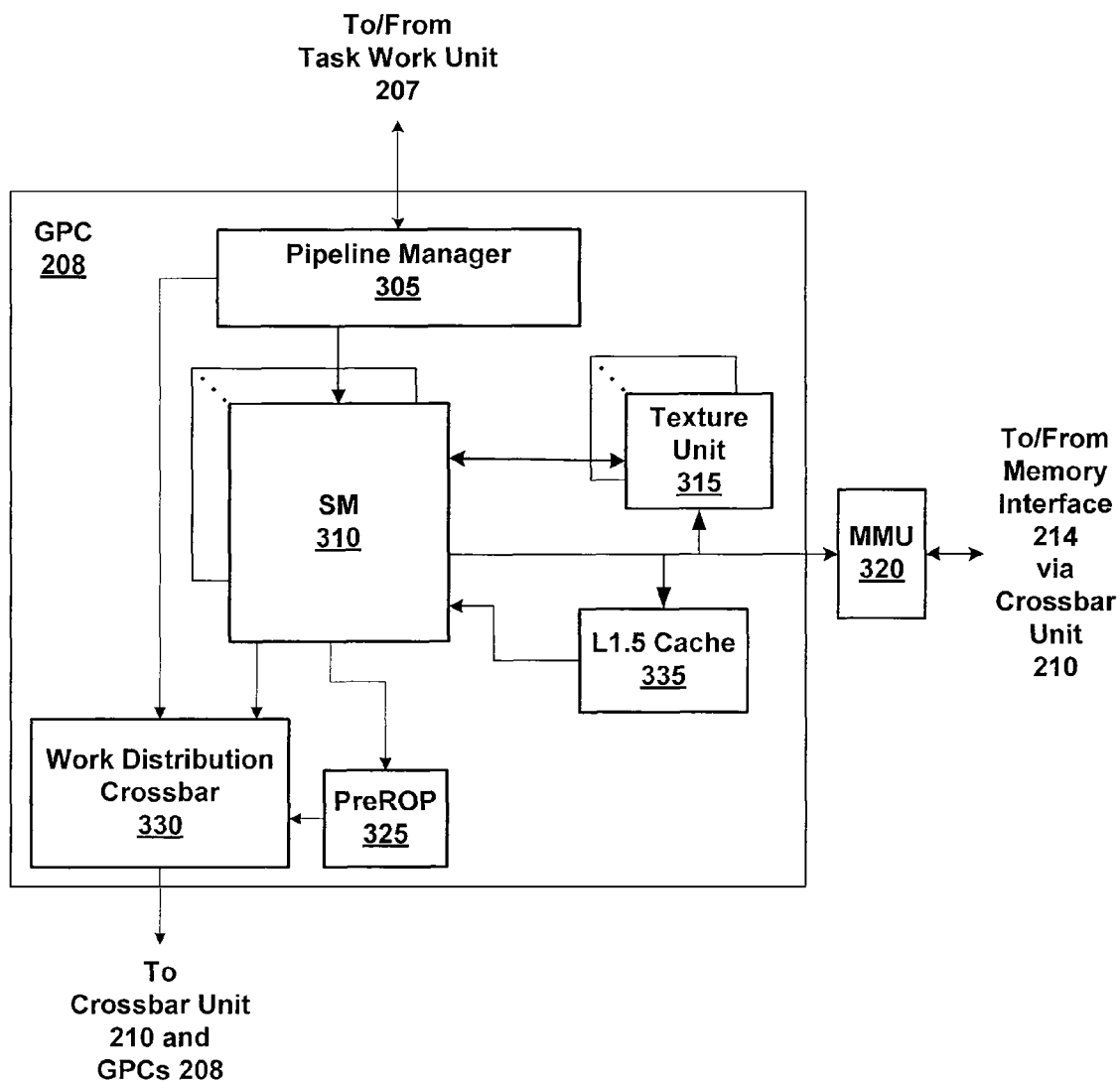
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
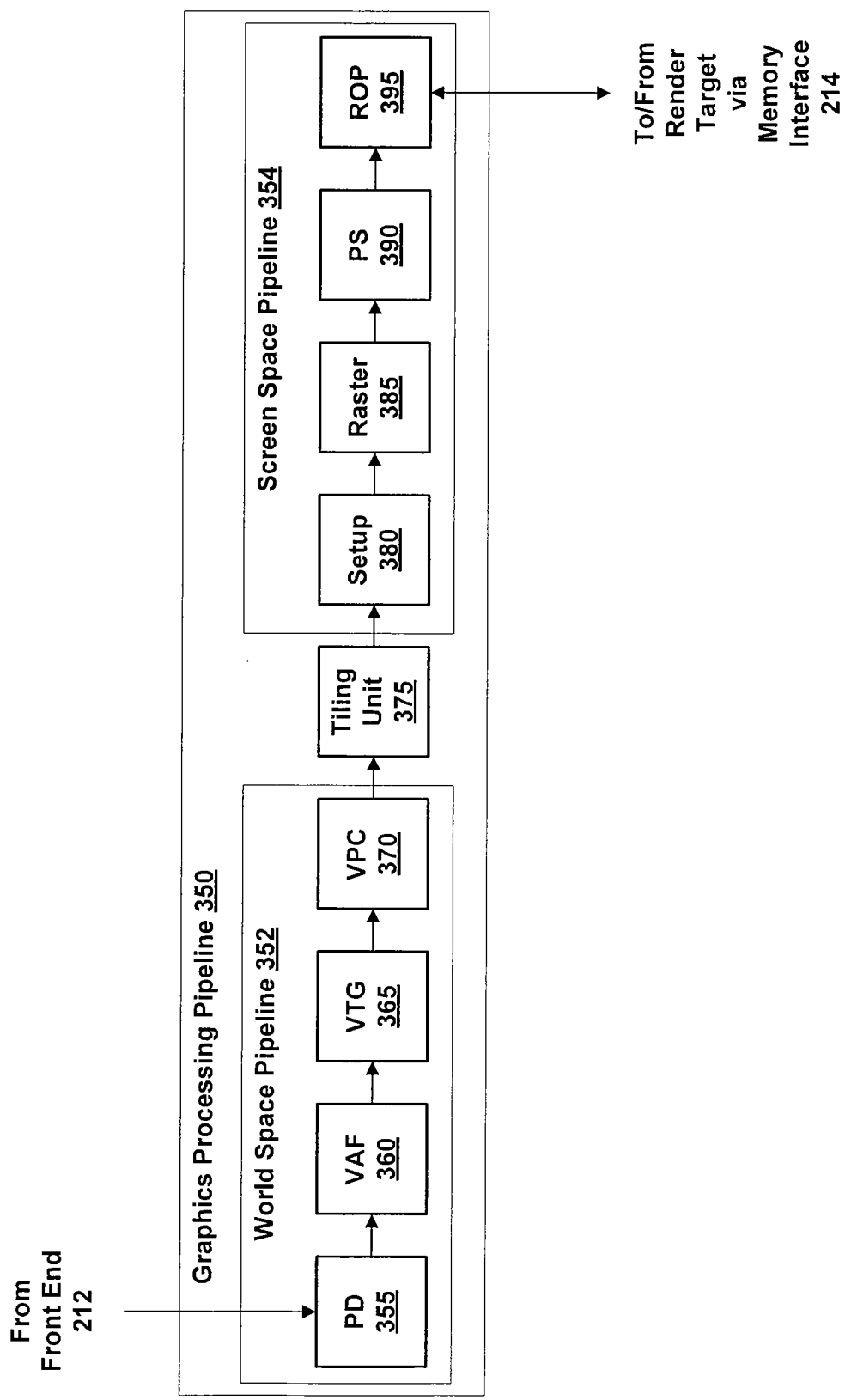
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives. for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Surface Resource View Hash

Figure 4:
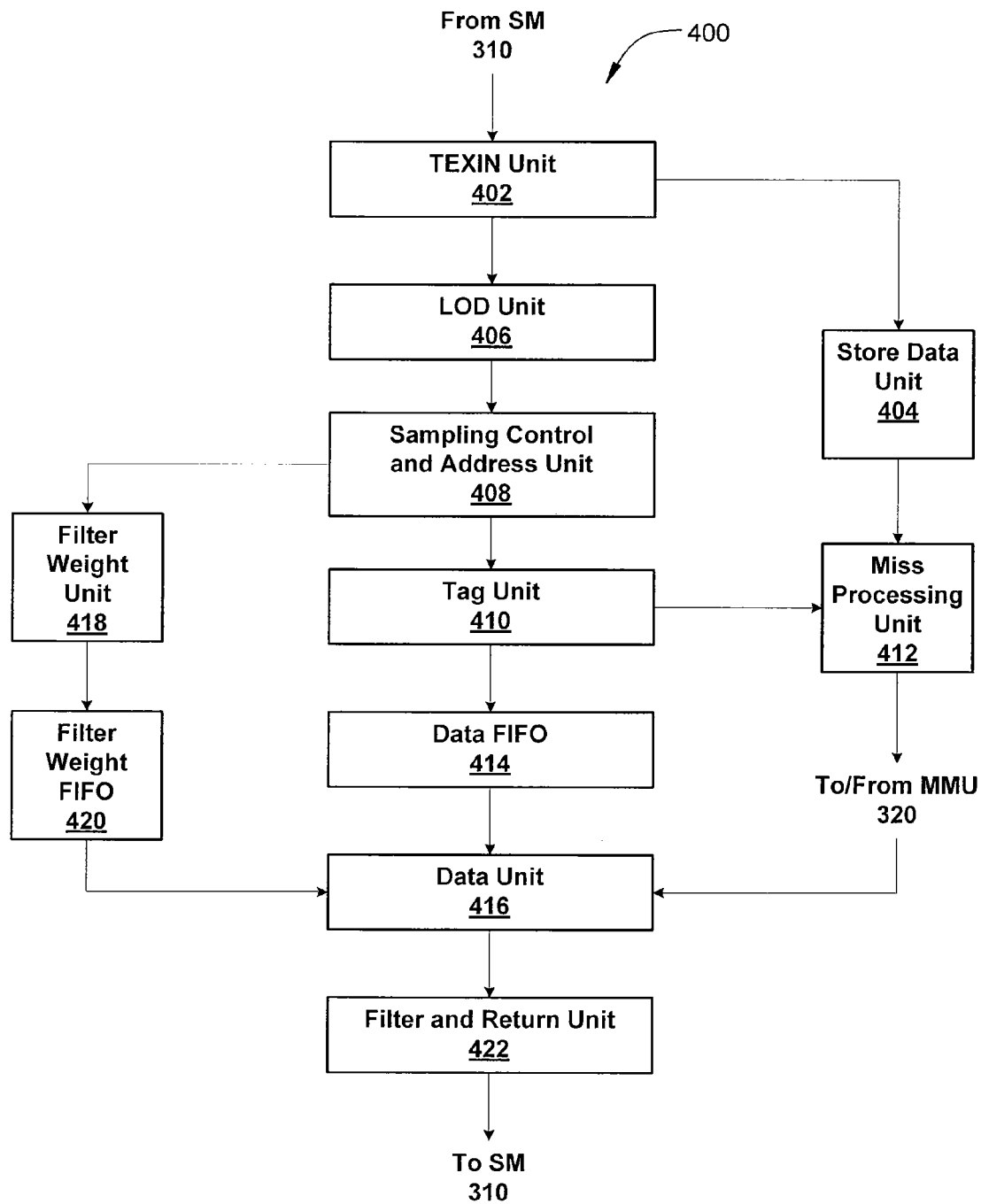
FIG. 4 is a conceptual diagram of a texture processing pipeline that a texture unit within the general processing cluster of FIG. 3A can be configured to implement, according to one embodiment of the present invention.

FIG. 4 is a conceptual diagram of a texture processing pipeline 400 that a texture unit 315 within the general processing cluster 208 of FIG. 3A can be configured to implement, according to one embodiment of the present invention. As shown, the texture processing pipeline 400 includes a texture input (TEXIN) unit 402, a store data unit 404, a level of detail (LOD) unit 406, a sampling control and address unit 408, a tag unit 410, a miss processing unit 412, a data first-in first-out memory (FIFO) 414, a data unit 416, a filter weight unit 418, a filter weight FIFO 420, and a filter and return unit 422.

The TEXIN unit 402 is configured to process memory access requests received from the SM 310 shown in FIG. 3B. For example, a given memory access request could represent a texture data access operation, such as, a read operation that reads a texture from memory. Alternatively, a given memory access request could represent a generic data access operation, such as a local or global memory load or store operation.

The TEXIN unit 402 determines whether a given memory access request represents a texture data access operation or a generic data access operation. For example, the TEXIN unit 402 could extract a bitfield in the received memory access request that indicates whether the memory access request represents a texture data access operation or a generic data access operation. If the TEXIN unit 402 determines that a given memory access request is a generic data access operation, then the TEXIN unit 402 configures the texture processing pipeline 400 to perform a generic data access operation. The TEXIN unit 402 routes the memory access request to the LOD unit 406. If the generic data access operation is a data store operation, then the TEXIN unit 402 routes the data portion of the data store operation to the store data unit 404.

In situations where the TEXIN unit 402 determines that the memory access request represents a texture data access operation, the TEXIN unit 402 configures the texture processing pipeline 400 to perform a texture data access operation and routes the memory access request to the LOD unit 406. When processing memory access requests that represent texture data access operations, the TEXIN unit 402 extracts additional texture information from a texture header, as further described herein, that corresponds to the texture data to be accessed from memory. A texture header is a structure describing the attributes of a texture or surface, such as the shape and location of a texture or surface in memory. The additional texture information may include any number of fields including, without limitation, texel size, texture surface base address, texture dimensions, and texture border data, among other types of texture-related information. The TEXIN unit 402 may incorporate this additional texture information into the memory access request and may then pass the memory access request to LOD unit 406.

The store data unit 404 receives data associated with generic data store operations and formats the data for storage in memory. The store data unit 404 provides a store data path from the texture processing pipeline 400 to main memory. The store data unit 404 enables store operations directed to various address spaces, including, without limitation, generic, global, local, and surface memory. The store data unit 404 transmits the formatted store data to the miss processing unit 412.

The LOD unit 406 is configured to compute a "level of detail" for the texture data to be accessed from memory based on the position and orientation of a set of coordinates included within the memory access request. The set of coordinates may represent the position and orientation of a texture residing within a graphics scene. LOD unit 406 may incorporate the computed level of detail into the memory access request and then pass the memory access request to the sampling control and address unit 408.

The sampling control and address unit 408 is configured to perform various address computations based on the coordinates within the memory access request. The results of the address computations may be used to identify an entry in a tag table included within tag unit 410. The sampling control and address unit 408 also provides information on how texture and surface information are sampled for certain memory access requests. The sampling control and address unit 408 may also support other functions, such as clamping, wrapping, and border color substitution behaviors for memory access requests that extend beyond the boundaries of a given texture or surface or that straddle the boundary between two textures or surfaces. The sampling control and address unit 408 passes the memory access request, address computation results, and sampling control information to the tag unit 410 and the filter weight unit 418.

The tag unit 410 includes a tag table that stores a set of texture header entries. Each texture header entry in the tag unit 410 represents a cache line within the data unit 416. The data unit 416 may represent a cache memory residing within the tag unit 315, or may represent any technically feasible cache memory associated with the SM 310. Upon receiving the memory access request and address computation results from the sampling control and address unit 408, the tag unit 410 determines whether the tag table includes a texture header entry corresponding to the texture or surface data to be retrieved. The texture header entries included within the tag unit 410 is discussed in greater detail below in conjunction with FIG. 5.

When the tag table includes an entry corresponding to the texture or surface data to be accessed, a cache hit occurs, and the tag unit 410 determines that texture or surface data to be accessed resides in the data unit 416. The tag unit 410 retrieves the entry by searching the tag table and retrieves an offset within the data unit 416 where the texture or surface data actually resides. That entry may include a tuple with multiple elements, including, without limitation, a texture identifier, a view type, a data size value, texture or surface dimensions, a hash value, and a base virtual address. The tag unit 410 passes the offset to the data FIFO 414.

When the tag table does not include a texture header entry corresponding to the texture or surface data to be accessed, a cache miss occurs, and the tag unit 410 causes the miss processing unit 412 to access the requested texture data from global memory.

The miss processing unit 412 may access the requested texture data by computing a virtual address based on data included within the memory access request, performing a virtual to physical address translation, and then reading the requested data from a physical location. In one embodiment, the miss processing unit 512 may reside within MMU 320 shown in FIG. 3A. The miss processing unit 412 may then populate the data unit 416 with the texture data or surface accessed from global or local memory and update the tag table within tag unit 410 to reflect the newly-cached texture or surface data. The texture data may then be provided to SM 310.

The miss processing unit 412 may also store data received from the store data unit 404 in global or local memory. The miss processing unit 412 may compute a virtual address based on data included within the memory access request, performing a virtual to physical address translation, and then store the corresponding data into a physical location in global or local memory. The miss processing unit 412 may retrieve the stored data from global or local memory. The miss processing unit 412 may then populate the data unit 416 with the texture data or surface accessed from global or local memory and update the tag table within tag unit 410 to reflect the newly-cached texture or surface data. The texture or surface data may then be provided to SM 310 for subsequent load operations associated with the retrieved data.

The data FIFO 414 delays the information from the tag unit 410 to match the delay through the filter weight unit 418 and the filter weight FIFO 420. As a result, the data from the tag unit 410 and corresponding data from the filter weight unit 418 arrive at the data unit 416 at the same time.

The filter weight unit 418 determines whether texture or surface data in addition to the data specified by the memory access request are needed to complete the request. Certain memory access requests specify that the retrieved data is filtered from multiple sample data associated with a texture or surface. The filter weight unit 418 determines which sample data to retrieve from the data unit 416, and the filter weights that apply to each of the sample data items. The filter weight unit 418 passes the sample data addresses and associated filter weights to the filter weight FIFO 420.

The filter weight FIFO 420 delays the information from the filter weight unit 418 to match the delay through the tag unit 410, the data FIFO 414, and other associated stages of the texture processing pipeline 400. As a result, the data from the filter weight unit 418 and corresponding data from the tag unit 410 arrive at the data unit 416 at the same time.

The data unit 416 receives memory addresses for one or more texture samples from the data FIFO 414 and the filter weight FIFO 420. The data unit 416 also receives corresponding filter weight values, if any, from the filter weight FIFO 420. The data unit 416 retrieves the data associated with the one or more texture samples from cache memory. The data unit 416 passes the retrieved data and associated filter weight information to the filter and return unit 422.

The filter and return unit 422 receives data and associated filter weight values from the data unit 416. The filter and return unit 422 applies one or more filters to the received data, including, without limitation, isotropic filters and anisotropic filters. The filter and return unit 422 passes the filtered data to the SM 310 in response to the memory access request.

FIG. 5 illustrates a texture header table 500 as stored in the tag unit 410 of FIG. 4, according to one embodiment of the present invention. As shown, the texture header table 500 includes a data field list 505 and individual texture header entries 510.

The data field list 505 includes the names of the various data fields in the associated texture header entries 510. As shown, the data field list 505 includes a texture identifier (texture ID) field 515, a view type field 520, a data format field 525, a width field 530, a height field 530, a depth/layer field 535, a hash value field 540, and a base virtual address field 545.

The texture ID field 515 specifies which texture or surface applies to the corresponding memory access request. The texture ID for each texture header entry 510 is unique. When the texture processing pipeline 400 receives a memory access request, the texture ID specified in the tuple of the memory access request is compared with the texture IDs in the texture header table 500. If the texture ID from the tuple matches the texture ID for a particular texture header entry 510, then that texture header entry 510 is used by the texture processing pipeline 400 to convert the tuple to a corresponding virtual address. Although the texture header entries 510(0)-510(5) shown in the texture header table 500 include sequential texture IDs, numbered from 0-5 respectively, any technically feasible approach may be used to provide a unique texture ID to each texture header entry 510.

In one embodiment, the texture ID field 515 is not an actual field that occupies space in each texture header entry 510. In such an embodiment, the texture ID field 515 may be an offset address that may be used to access the texture header associated with a particular texture ID. As such, if a memory access operation specifies a load or store operation directed to a texture with texture ID 'N,' then the texture header entry associated with texture ID 'N' may be stored at address location:

texture_header_base_address+(N×sizeof(texture_header_ entry).

The view type field 520 specifies the type of texture or surface associated with the texture header entry 510. A 3D surface is a set of texture elements (texels) that exist in three dimensions. That is, a 3D surface may have a width, height, and depth specified in texel units. A 2D array includes one or more two-dimensional texel sets, arranged in layers. That is, each texel set in the 2D array may have a width and height specified in texel units, and a quantity of layers that specifies the number of 2D texel sets in the 2D array. A 2D slice includes a single two-dimensional slice of a 3D surface or a 2D array. That is, a 2D slice may include the set of texels that exists at a particular depth within a 3D surface. Alternatively, a 2D slice may include the set of texels that exists in a particular layer within a 2D array. Although the texture header table 500 is shown with 3D surfaces, 2D arrays, and 2D slices, the view type field 520 could include any technically feasible texture or surface types including, without limitation, a 1D array, a cubemap, a cubemap array, a multum in parvo map (MIP map), or a particular level of detail (LOD) layer within a MIP map. Note that a cubemap is an environment with six square textures, where each texture includes a projection of a graphics environment onto the six faces of a cube. A MIP map is a collection of related textures, where each texture is a bitmap image that includes a version of the main texture, and each bitmap image represents a different level of detail of the main texture.

The data format field 525 specifies the type, size, and quantity of data elements stored in each texel location in the corresponding texture or surface. As shown, the data size field 525 may indicate the number of bytes consumed by each texel. However, the data format may be specified in any technically feasible quantity, including, without limitation, 16-bit words, 32-bit words, or 64-bit words. The data format field 525 may specify multiple data elements, including, without limitation, four 8-bit words or two 32-bit words.

The width field 530 specifies the extent in a first direction, such as an x-direction, of the texture or surface corresponding to the texture header entry 510. The texture processing pipeline 400 may use the x-value of the tuple associated with the memory access request to access a texel at a particular location along the width of the texture or surface corresponding to the texture header entry 510.

The height field 530 specifies the extent in a second direction, such as a y-direction, of the texture or surface corresponding to the texture header entry 510. The texture processing pipeline 400 may use the y-value of the tuple associated with the memory access request to access a texel at a particular location along the height of the texture or surface corresponding to the texture header entry 510.

The depth/layer field 535 specifies the extent in a third direction, such as a z-direction, of a 3D texture or surface corresponding to the texture header entry 510. The texture processing pipeline 400 may use the z-value of the tuple associated with the memory access request to access a texel at a particular location along the depth of the 3D texture or surface corresponding to the texture header entry 510. Alternatively, the depth/layer field 535 specifies the quantity of layers included in a 2D texture or surface array corresponding to the texture header entry 510. The texture processing pipeline 400 may use an index value in the tuple associated with the memory access request to access a texel at a particular layer number in the 2D texture or surface array corresponding to the texture header entry 510. Because a 2D slice has no depth or quantity of layers, the depth/layer field 535 is not used with a 2D slice.

The hash value field 540 is a resource view coherency hash (RVCH) value that indicates whether the view of the texture or surface corresponding to the texture header entry 510 is aliased to at least one other view of the same texture or surface. In one embodiment, the hash value from the hash value field 540 may be stored with every cache line associated with a given texture header entry 510 in addition to storing the hash value in the hash value field 540 of the texture header entry 510.

In one embodiment, the hash value field 540 may be a single bit value. In such an embodiment, a hash value of one may indicate that the view corresponding to the texture header entry 510 is not aliased to any other view represented by the texture header entries 510 in the texture header table 500. Two texture header entries may be considered to be aliased if the memory used to store the texture data corresponding to one of the texture header entries overlaps with the memory used to store the texture data corresponding to the other texture header entry. A hash value of one may also indicate that the view corresponding to the texture header entry 510 is aliased to another view represented by the texture header entries 510 in the texture header table 500, but in such a manner that processing a memory access request for one view does not cause cache coherency or consistency problems with respect to the aliased view. As such, if a view is associated with a hash value of one, then a store operation directed to that view will be observed by a load operation using a different view, without causing coherency or consistency problems.

A hash value of zero may indicate that the view corresponding to the texture header entry 510 is aliased to at least one other view represented by the texture header entries 510 in the texture header table 500. If an invalidating event, such as a write to an aliased view, occurs, the texture processing unit 400 may invalidate all texture header entries 510 with a hash value of zero. Accordingly, all aliased texture header entries 510 are invalidated when an invalidating event occurs in any aliased view. In addition, data cache entries in the texture cache that correspond to the invalidated texture header entries 510 are also invalidated. Accordingly, data cache entries in the texture cache are tagged by an index in the associated texture header entries 510, such that when a particular texture header entry 510 is invalidated, all corresponding data cache entries in the texture cache are also invalidated. The texture processing pipeline 400 may treat views associated with a zero hash value as uncached.

In another embodiment, the hash value field 540 may be a multi-bit value. In such an embodiment, a non-zero hash value may indicate that the view corresponding to the texture header entry 510 is not aliased to any other view represented by the texture header entries 510 in the texture header table 500. A non-zero hash value may also indicate that the view corresponding to the texture header entry 510 is aliased to another view represented by the texture header entries 510 in the texture header table 500, but in such a manner that processing a memory access request for one view does not cause cache coherency or consistency problems with respect to the aliased view. A hash value of zero may indicate that the view corresponding to the texture header entry 510 is potentially aliased to at least one other view with the same hash value and included in the texture header entries 510 in the texture header table 500. The texture processing pipeline 400 may treat views associated with a zero hash value as uncached. The hash value may be a hash computed via any technically feasible approach, such as hash of one or more data fields in the data field list 505. For example, the hash value for a given texture header entry 510 could be a hash of the address of the full memory allocation associated with the view represented by the texture head entry 510. As such, if a first texture header entry and a second texture header entry have different hash values, then the two texture header entries do not represent aliased views.

In yet another embodiment, the hash field value field 540 may be a single-bit or multi-bit enumerated value, where each enumerated value represents a different hash category.

A first hash category may be identified HASH_UNCACHED. If the hash value field 540 identifies a texture header entry 510 as a HASH_UNCACHED view, then the view is known to be aliased to at least one other view. The corresponding cache lines are treated as uncached for one or more reasons, including, without limitation, the known aliasing issues are not easily resolved, aliasing information is known but the texture header entry 510 is conservatively marked as uncached, or there exists a desire to force accesses to the given view to be uncached.

A second hash category may be identified HASH_ALIASED[0, 1, 2, . . . , N], where the value 0-N identifies one of N−1 "alias sets" to which a texture header entry 510 belongs. If the hash value field 540 identifies a texture header entry 510 as a HASH_ALIASED[0, 1, 2, . . . , N] view, then the view is known to be aliased to at least one other view. Texture header entries 510 that are marked as HASH_ALIASED and have the same hash value may be aliased to each other. Texture header entries 510 that are marked as HASH_ALIASED and do not have the same hash value are not aliased to each other. In other words, a texture header entry 510 that is marked as HASH_ALIASED[0] may be aliased to other texture header entries 510 that are marked as HASH_ALIASED[0]. However, a texture header entry 510 that is marked as HASH_ALIASED[0] is not aliased to texture header entries 510 that are marked as HASH_ALIASED[1], HASH_ALIASED[2], and so on. When an invalidating event occurs involving a HASH_ALIASED texture header entry 510, then all HASH_ALIASED texture header entries 510 in the same alias set as the HASH_ALIASED texture header entry 510 that caused the invalidating event are likewise invalidated. HASH_ALIASED texture header entries 510 in different alias sets from the HASH_ALIASED texture header entry 510 that caused the invalidating event are not invalidated.

Two texture header entries 510 that are marked as HASH_ALIASED and have the same hash value may not necessarily be aliased to each other. For example, if the texture header table 500 already includes N−1 sets of HASH_ALIASED, then a new HASH_ALIASED set may share a hash value with a different HASH_ALIASED set. As such, when a HASH_ALIASED texture header entry 510 causes an invalidating event, all HASH_ALIASED texture header entry 510 in the same alias set may be invalidated whether or not these HASH_ALIASED texture header entry 510 are actually aliased to the HASH_ALIASED texture header entry 510 causing the invalidating event. Accordingly, there is some probability that other texture header entries 510 may be unnecessarily invalidated. This probability may decrease as the number of HASH_ALIASED alias sets increases.

A third hash category may be identified as HASH_UNALIASED. If the hash value field 540 identifies a texture header entry 510 as a HASH_UNALIASED view, then the view is not known to be aliased to any other view, and there are no restrictions on caching associated data lines in regards to the hash value. The corresponding cache lines may be treated as cached.

In one embodiment where the hash value field 540 is a single-bit enumerated value, the hash value may be designated as either HASH_UNALIASED or HASH_UNCACHED. Texture header entries 510 may be designated as HASH_UNALIASED where aliasing is known not to occur, or if aliasing may occur, such aliasing does not result in cache coherence or consistency issues. Texture header entries 510 may be designated as HASH_UNCACHED to treat such texture header entries 510 as uncached in order to avoid cache coherence or consistency issues.

In an alternative embodiment where the hash value field 540 is a single-bit enumerated value, the hash value may, the hash value may be designated as either HASH_UNALIASED or HASH_ALIASED[0]. Texture header entries 510 may be designated as HASH_UNALIASED where aliasing is known not to occur, or if aliasing may occur, such aliasing does not result in cache coherence or consistency issues. Texture header entries 510 may be designated as HASH_ALIASED[0] to group potential alias sets together regardless of whether a first set is known not to alias with a second set. As such, the HASH_ALIASED[0] hash value may generate false invalidates but may allow at least some caching.

In an embodiment where the hash value field 540 is a multi-bit enumerated value, the hash value may be designated as HASH_UNALIASED or HASH_[0, . . . , N], as described above. The HASH_UNCACHED enumerated value may be unused in this embodiment. Alternatively, one of the alias sets in the HASH_ALIASED[0, . . . , N] may be designated to indicate that the corresponding texture header entries 510 are uncached.

In any of the embodiments described above, various conditions may be classified as an invalidating event. A store of data to one view of a texture or surface may be an invalidating event as to other views of the same texture or surface. An invalidating event may be programmatic, where an executing application program or method includes an invalidate command, specifying a texture ID of a view to invalidate. The texture processing pipeline 400 invalidates the texture header entry 510 specified in the invalidate instruction. The texture processing pipeline 400 also invalidates other texture header entries 510 with a hash value matching the hash value matching that of the invalidating texture header entry 510. Finally, an invalidating event occurring in one graphics processing pipeline 350 may result in views with matching hash values being invalidated in one or more other graphics processing pipelines 350 in the GPC 208.

In one embodiment, the texture processing unit 400 may compare elements of the cached tuples from one or more cache entries with specific elements of the tuple associated with the memory access operation in order to further reduce the occurrence of false invalidates. As such, the texture processing unit 400 may perform one comparison per cache entry, and may invalidate each cache entry that meets the additional criteria, based on the result the comparison. For example, the texture header table 500 could include two texture header entries 510 that are potentially aliased to each other. However, the two texture header entries 510 could have the property that a texel associated with one of the two texture header entries only aliases with a texel associated with the second texture header entry when the tuples associated with the two texels have the same 'X' coordinate. As such, an invalidating event may invalidate only cache lines associated with the two texture header entries that include a texel with the same X coordinate as the texel associated with the current memory access operation.

In another embodiment, the texture processing unit 400 may compare one or more additional data fields in the texture header entries 510 with specific elements of the tuple associated with the memory access operation in order to further reduce the occurrence of false invalidates, without retrieving cached tuples from the cache entries. As such, the texture processing unit 400 may perform one comparison per texture header, and may invalidate each cache entry associated with any texture header that meets the additional criteria, based on the result the comparison. For example, the texture header table 500 could include a texture header entry 510 that includes a height field 530 with a value of 10, and the tuple associated with the memory access operation could have a 'Y' coordinate of 40. As such, the rectangle represented by the tuple would have a height that is at least 40 units, while the view associated with the texture header entry 510 would have height that is only 10 units. As a result, the memory access operation that specifies a Y coordinate of 40 could not alias with a view associated with a texture header entry 510 that specifies a height of 10.

The base virtual address field 545 specifies the starting address, in virtual memory space, of the view of the texture or surface corresponding to the texture header entry 510. Alternatively, the base virtual address field 545 could specify the starting address, in physical memory space, of the view of the texture or surface corresponding to the texture header entry 510.

Texture header entry 510(0) specifies a 2D array that includes 8 layers of 2-byte texels, where each layer is 16 texels wide by 16 texels high. Texture header entry 510(0) has a starting address of 0xB800_0000. Texture header entry 510(0) has a hash value of 0, indicating that the associated view is not aliased with any other view.

Texture header entry 510(1) specifies a 3D texture that is 32 texels wide by 32 texels high by 16 texels deep, where each texel is 4 bytes. Texture header entry 510(1) has a starting address of 0xB900_0000. Texture header entry 510(1) has a hash value of 1, indicating that the associated view is aliased with at least one other view.

Texture header entry 510(2) specifies a 2D array that includes 8 layers of 4-byte texels, where each layer is 32 texels wide by 32 texels high. Texture header entry 510(2) has a starting address of 0xB900_8000. Texture header entry 510(2) has a hash value of 1, indicating that the associated view is aliased with at least one other view. As shown, texture header entry 510(2) is aliased with the second half of the view associated with texture header entry 510(1).

Texture header entry 510(3) specifies a 2D slice that is 32 texels wide by 32 texels high, where each texel is 4 bytes. Texture header entry 510(3) has a starting address of 0xB900_9000. Texture header entry 510(3) has a hash value of 1, indicating that the associated view is aliased with at least one other view. As shown, texture header entry 510(3) is aliased with the second layer of the view associated with texture header entry 510(2). Texture header entry 510(3) is also aliased with a 2D slice of the 3D texture corresponding to texture header entry 510(1), at a depth of 9.

Texture header entry 510(4) specifies a 2D array with 10 layers of 16×16 1-byte texels. Texture header 510(5) specifies a 2D slice aliased to one of the layers in the 2D array associated with texture header entry 510(4).

It will be appreciated that the architecture described herein is illustrative only and that variations and modifications are possible. In one example, the techniques are described herein in the context of a texture header table 500 that includes specific data fields corresponding to various views of textures and surfaces. However, the described techniques could be employed using any technically feasible quantity and arrangement of data fields, including, without limitation, data fields in addition to those shown in the texture header table 500 of FIG. 5, or a subset of the data fields shown in the texture header table 500 of FIG. 5, whether or not such data fields are within the context of a texture header table. In another example, the techniques are described herein in the context of a texture memory. However, the described techniques could be applied to any other technically feasible memory allocation where multiple views of the memory allocation may result in aliasing. In yet another example, the texture header table 500 may be stored in any technically feasible storage medium including, without limitation, system memory 104, a group of registers, or a data file. A portion of the texture header entries 510 in the texture header table 500 may be stored in a cache memory accessible to the texture unit 315.

Figure 6:
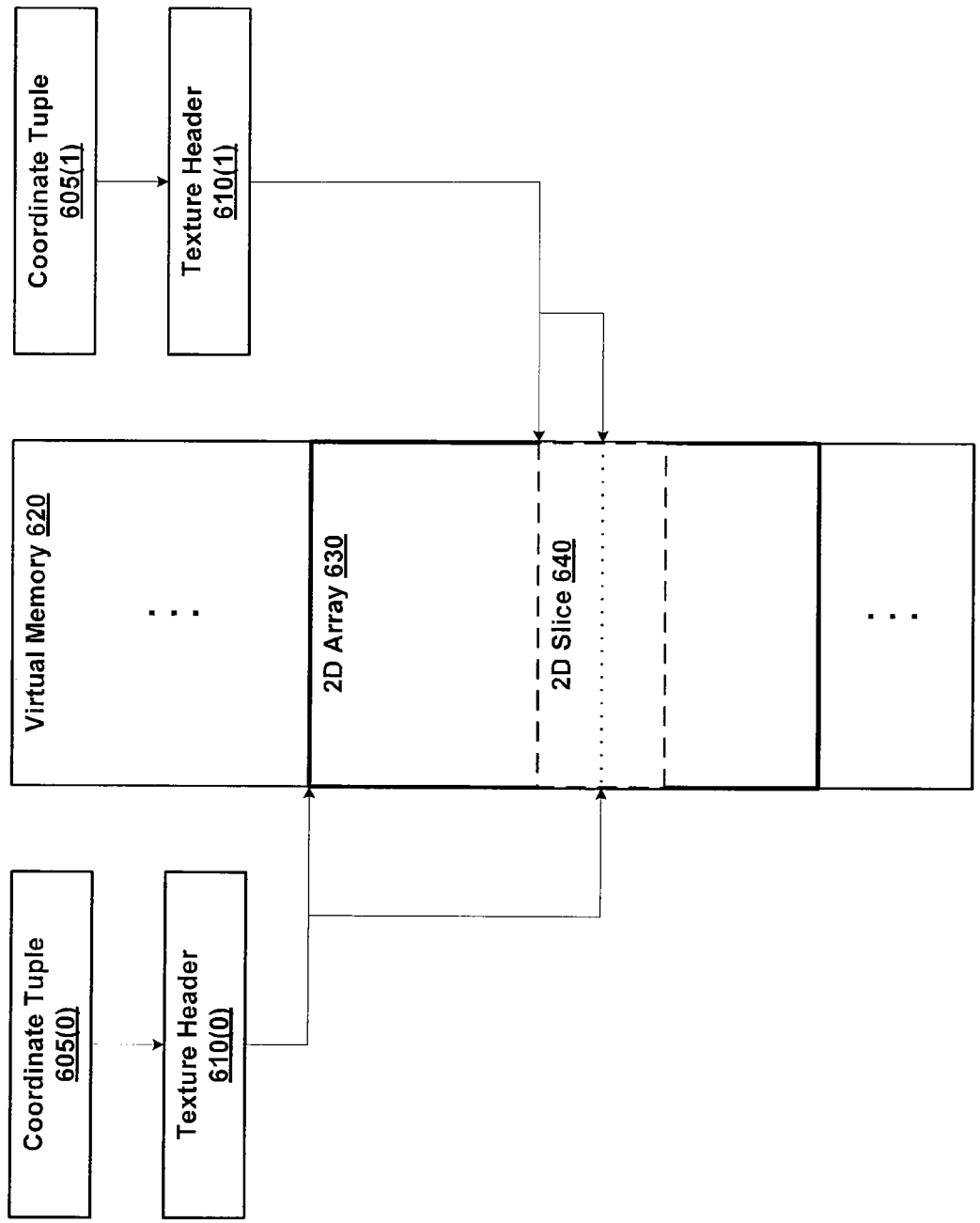
FIG. 6 illustrates a virtual memory space accessible via memory access requests that include coordinate tuples associated with texture headers, according to one embodiment of the present invention.

FIG. 6 illustrates a virtual memory space 600 accessible via memory access requests that include coordinate tuples 605 associated with texture header entries 610, according to one embodiment of the present invention.

Coordinate tuple 605(0) is associated with a memory access associated with texture header entry 610(0). Texture header entry 610(0) corresponds to a view of a 2D array 630 existing in virtual memory 620. The texture header entry 610(0) specifies the base address of the 2D array 630. The texture processing pipeline 400 combines the values specified in the coordinate tuple 605(0) with data in the data fields of texture header entry 610(0) to determine the corresponding virtual address accessed by the memory access request.

Coordinate tuple 605(1) is associated with a memory access associated with texture header entry 610(1). Texture header entry 610(1) corresponds to a view of a 2D slice 640 existing in virtual memory 620. As shown, the 2D slice 640 is aliased to a portion of the 2D array 630. The texture header entry 610(1) specifies the base address of the 2D slice 640. The texture processing pipeline 400 combines the values specified in the coordinate tuple 605(1) with data in the data fields of texture header entry 610(1) to determine the corresponding virtual address accessed by the memory access request. As shown, coordinate tuple 605(0) accesses the same virtual memory address as coordinate tuple 605(1). Accordingly, an invalidating event corresponding to either coordinate tuple 605(0) or coordinate tuple 605(1) will invalidate both texture header entry 610(0) and texture header entry 610(1).

Figure 7:
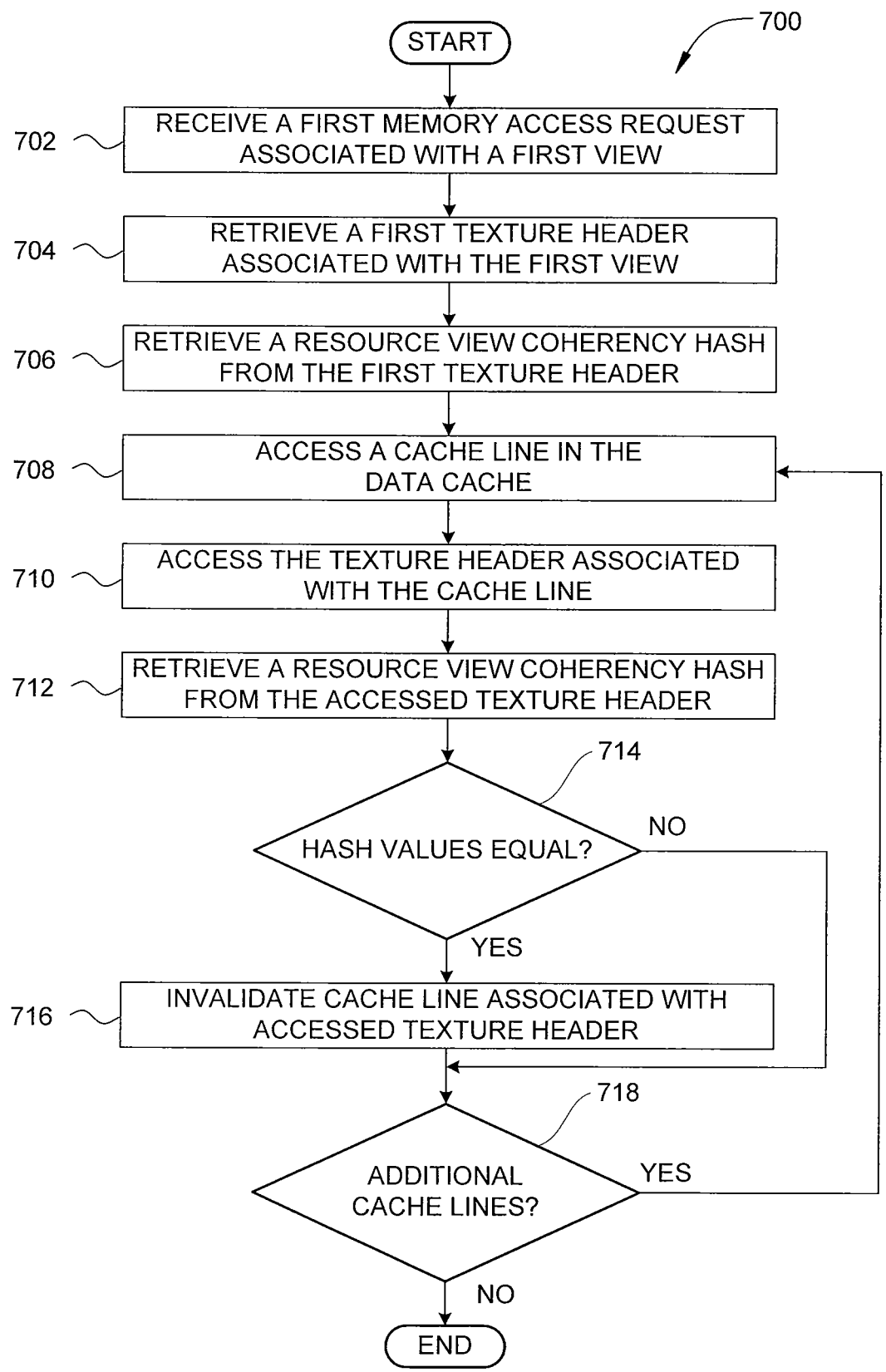
FIG. 7 sets forth a flow diagram of method steps for performing memory access operations, according to one embodiment of the present invention.

FIG. 7 sets forth a flow diagram of method steps for performing memory access operations, according to one embodiment of the present invention. Although the method steps are described in conjunction with the systems of FIGS. 1-6, persons of ordinary skill in the art will understand that any system configured to perform the method steps, in any order, is within the scope of the invention.

As shown, a method 700 begins at step 702, where the texture unit 315 receives a first memory access request that includes an address tuple and is associated with a first view of a surface texture. At step 704, the texture unit 315 retrieves a first texture header, where the first texture header entry is associated with the first view. At step 706, the texture unit 315 retrieves a resource view coherency hash (RVCH) from the first texture header entry. At step 708, the texture unit 315 accesses a cache line in the data cache, such as the texture cache. At step 710, the texture unit 315 access the texture header entry in the texture header table that is associated with the accessed cache line. At step 712, the texture unit 315 retrieves an RVCH from the accessed texture header entry.

At step 714, the texture unit 315 determines whether the RVCH value of the accessed texture header entry is equal to the RVCH value of the first texture header entry. If the value of the accessed texture header entry is equal to the RVCH value of the first texture header entry, then the method 700 proceeds to step 716, where the texture unit 315 invalidates the cache line associated with the accessed texture header entry. At step 718, the texture unit 315 determines whether additional cache lines in the data cache remain to be processed. If additional cache lines remain, then the method 700 proceeds to step 708, described above. If, however, no additional cache lines remain, then the method 700 terminates.

Returning to step 714, if the value of the accessed texture header entry is equal to the RVCH value of the first texture header entry, then the method 700 proceeds to step 712, described above.

In sum, cache line entries in a data cache, such as a texture cache, are associated with texture header entries that define a particular view of a surface texture stored in the texture cache. The cache line entries include a resource view coherency hash (RVCH) that identifies whether a given cache line associated with a first view may be aliased with another cache line associated with a second view. Multiple cache lines corresponding to aliased views of the same surface texture remain valid in the texture cache until the occurrence of an invalidating event. If an aliased cache line experiences an invalidating event, such as when the texture unit of a GPU writes to a particular cache line in the texture cache, then all cache lines that have an RVCH that matches the RVCH of the particular cache line are invalidated. Subsequent accesses of such invalidated cache lines results in a cache miss, forcing the cache to retrieve updated data from memory. In one embodiment, the RVCH may be a single bit that indicates whether the cache line is aliased to at least one other cache line. In such cases, all aliased cache lines are invalidated when any cache line experiences an invalidating event. In other embodiments, the RVCH may be a multi-bit field that may be unique to a set of cache lines that are aliased to each other. In such cases, only those cache lines that have a matching RVCH are invalidated. As a result, the likelihood of "false" invalidates is reduced.

One advantage of the approaches disclosed herein is that cache coherency and consistency of a texture cache is maintained, even when multiple views of a surface texture map are simultaneously active. When an aliased cache line experiences an invalidating event, only those cache lines with a matching hash value are invalidated. Texture cache misses and, correspondingly, fetches from system memory are thereby reduced. As a result, cache performance is improved and power consumption is reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for performing memory access operations, the method comprising:
   retrieving a first hash value associated with a first texture header in a plurality of texture headers, wherein the first texture header is related to a first view in a plurality of views;
   retrieving a second hash value associated with a second texture header in the plurality of texture headers, wherein the second texture header is related to a second view in the plurality of views;
   determining whether at least a portion of the first view is potentially aliased with at least a portion of the second view, based on the first hash value and the second hash value;
     if at least a portion of the first view is potentially aliased with at least a portion of the second view, then invalidating a first cache entry in a cache memory associated with the second texture header, or
     if no portion of the first view is potentially aliased with any portion of the second view, then maintaining the first cache entry associated with the second texture header.

2. The method of claim 1, wherein at least a portion of the first view is potentially aliased with at least a portion of the second view when the first hash value is equal to the second hash value.

3. The method of claim 1, wherein the first hash value indicates that the first view is not aliased to any other view in the plurality of views.

4. The method of claim 1, further comprising:
   retrieving a third hash value associated with a third texture header in the plurality of texture headers, wherein the third texture header is related to a third view in the plurality of views;
   determining that at least a portion of the first view is potentially aliased with at least a portion of the third view in a manner that causes no incoherency in the cache memory, based on at least one of the first hash value, the third hash value, the first texture header, and the third texture header; and
   maintaining the first cache entry associated with the third texture header.

5. The method of claim 1, wherein the first hash value comprises a multi-bit field.

6. The method of claim 1, wherein the first texture header comprises at least one of a texture identifier, a view type, a data size, a width, a height, a depth, a quantity of layers, a hash value, and a base address.

7. The method of claim 1, wherein a first tuple included in a first memory access operation associated with the first view comprises at least one of a texture identifier, an index, an x-coordinate, a y-coordinate, a z-coordinate, and a layer number.

8. The method of claim 1, further comprising receiving a first memory access operation associated with the first view; and receiving a second memory access operation associated with a third view in the plurality of views.

9. The method of claim 8, further comprising:
   retrieving a third hash value associated with a third texture header in the plurality of texture headers, wherein the third texture header is related to the third view;
   determining whether all memory access operations related to the third view are to be treated as uncached, based on the third hash value; and
   if memory access operations related to the third view are to be treated as uncached, then updating only a first memory location, wherein the first memory location is specified by the second memory access operation, or
   if memory access operations related to the third view are not to be treated as uncached, then:
     updating the first memory location; and
     updating a second memory location in the cache memory, wherein the second memory location corresponds to the first memory location.

10. The method of claim 8, further comprising:
    retrieving a third hash value associated with a third texture header in the plurality of texture headers, wherein the third texture header is related to the third view;
    retrieving a fourth hash value associated with a fourth texture header in the plurality of texture headers, wherein the fourth texture header is related to a fourth view in the plurality of views;
    determining that at least a portion of the third view is potentially aliased with at least a portion of the fourth view, based on the third hash value and the fourth hash value;
    determining that the second memory access operation causes no incoherency in the cache memory, based on at least one element in each of the second tuple and the fourth texture header; and maintaining the first cache entry associated the fourth texture header.

11. The method of claim 8, further comprising:
retrieving a third hash value associated with a third texture header in the plurality of texture headers, wherein the third texture header is related to the third view;
retrieving a fourth hash value associated with a fourth texture header in the plurality of texture headers, wherein the fourth texture header is related to a fourth view in the plurality of views;
determining that at least a portion of the third view is potentially aliased with at least a portion of the fourth view, based on the third hash value and the fourth hash value;
retrieving a second cache entry associated with the fourth view;
retrieving a third tuple associated with the second cache entry;
determining that the second memory access operation causes no incoherency in the cache memory, based on at least one element in the second tuple and at least one element in the third tuple; and
maintaining the second cache entry.

12. A subsystem comprising:
a texture unit configured to:
receive a first memory access operation that includes a first tuple associated with a first view in a plurality of views;
retrieve a first hash value associated with a first texture header in a plurality of texture headers, wherein the first texture header is related to the first view;
retrieve a second hash value associated with a second texture header in the plurality of texture headers, wherein the second texture header is related to a second view in the plurality of views;
determine whether at least a portion of the first view is potentially aliased with at least a portion of the second view, based on the first hash value and the second hash value;
if at least a portion of the first view is potentially aliased with at least a portion of the second view, then invalidate a first cache entry in a cache memory associated with the second texture header, or
if no portion of the first view is potentially aliased with any portion of the second view, then maintain the first cache entry associated with the second texture header.

13. The subsystem of claim 12, wherein at least a portion of the first view is potentially aliased with at least a portion of the second view when the first hash value is equal to the second hash value.

14. The subsystem of claim 12, wherein the first hash value indicates that the first view is not aliased to any other view in the plurality of views.

15. The subsystem of claim 12, wherein the texture unit is further configured to:
retrieve a third hash value associated with a third texture header in the plurality of texture headers, wherein the third texture header is related to a third view in the plurality of views;
determine that at least a portion of the first view is potentially aliased with at least a portion of the third view in a manner that causes no incoherency in the cache memory, based on at least one of the first hash value, the third hash value, the first texture header, and the third texture header; and
maintain the first cache entry associated with the third texture header.

16. The subsystem of claim 12, wherein the texture unit is further configured to:
receive a second memory access operation that includes a second tuple associated with a third view in the plurality of views;
retrieve a third hash value associated with a third texture header in a plurality of texture headers, wherein the third texture header is related to the third view;
determine whether all memory access operations related to the third view are to be treated as uncached, based on the third hash value; and
if memory access operations related to the third view are to be treated as uncached, then update only a first memory location, wherein the first memory location is specified by the second memory access operation, or
if memory access operations related to the third view are not to be treated as uncached, then:
update the first memory location; and
update a second memory location in the cache memory, wherein the second memory location corresponds to the first memory location.

17. The subsystem of claim 12, wherein the texture unit is further configured to:
receive a second memory access operation that includes a second tuple associated with a third view in the plurality of views;
retrieve a third hash value associated with a third texture header in a plurality of texture headers, wherein the third texture header is related to the third view;
retrieve a fourth hash value associated with a fourth texture header in the plurality of texture headers, wherein the fourth texture header is related to a fourth view in the plurality of views;
determine that at least a portion of the third view is potentially aliased with at least a portion of the fourth view, based on the third hash value and the fourth hash value;
determine that the second memory access operation causes no incoherency in the cache memory, based on at least one element in each of the second tuple and the fourth texture header; and
maintain the first cache entry associated the fourth texture header.

18. The subsystem of claim 12, wherein the texture unit is further configured to:
receive a second memory access operation that includes a second tuple associated with a third view in the plurality of views;
retrieve a third hash value associated with a third texture header in a plurality of texture headers, wherein the third texture header is related to the third view;
retrieve a fourth hash value associated with a fourth texture header in the plurality of texture headers, wherein the fourth texture header is related to a fourth view in the plurality of views;
determine that at least a portion of the third view is potentially aliased with at least a portion of the fourth view, based on the third hash value and the fourth hash value;
retrieve a second cache entry associated with the fourth view;
retrieve a third tuple associated with the second cache entry;

determine that the second memory access operation causes no incoherency in the cache memory, based on at least one element in the second tuple and at least one element in the third tuple; and maintain the second cache entry.

19. The subsystem of claim 12, wherein the first hash value comprises a multi-bit field.

20. The subsystem of claim 12, wherein the first texture header comprises at least one of a texture identifier, a view type, a data size, a width, a height, a depth, a quantity of layers, a hash value, and a base address.

21. A system comprising:

a processor; and a texture unit configured to:

retrieve a first hash value associated with a first texture header in a plurality of texture headers, wherein the first texture header is related to a first view in a plurality of views;

retrieve a second hash value associated with a second texture header in the plurality of texture headers, wherein the second texture header is related to a second view in the plurality of views; and determine whether at least a portion of the first view is potentially aliased with at least a portion of the second view based on the first hash value and the second hash value.

* * * * *